United States Patent
Auer et al.

(10) Patent No.: US 6,772,833 B2
(45) Date of Patent: Aug. 10, 2004

(54) HVAC SYSTEM WITH MODULAR INSERTS

(75) Inventors: Soenke Auer, Rösrath (DE); Stefan Brand, Cologne (DE)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/201,390

(22) Filed: Jul. 23, 2002

(65) Prior Publication Data

US 2004/0016536 A1 Jan. 29, 2004

(51) Int. Cl.$^7$ ................................................ B60H 1/00
(52) U.S. Cl. ..................... 165/203; 165/202; 165/42; 454/121
(58) Field of Search ................. 165/202, 203, 165/42; 454/69, 121, 156

(56) References Cited

U.S. PATENT DOCUMENTS

| | | | |
|---|---|---|---|
| 4,586,652 A | | 5/1986 | Sakurai |
| 4,742,762 A | * | 5/1988 | Ito et al. .................... 165/42 X |
| 4,852,639 A | * | 8/1989 | Horiguchi et al. ............. 165/42 |
| 5,042,566 A | | 8/1991 | Hildebrand |
| 5,101,883 A | | 4/1992 | Kinmartin et al. |
| 5,106,018 A | * | 4/1992 | Loup ......................... 165/42 X |
| 5,186,237 A | | 2/1993 | Adasek et al. ................. 165/42 |
| 5,350,335 A | | 9/1994 | Andersson .................... 165/42 |
| 5,601,142 A | | 2/1997 | Hildebrand et al. ........... 165/42 |
| 5,673,964 A | | 10/1997 | Roan et al. ............... 454/121 X |
| 5,803,160 A | * | 9/1998 | Danieau ....................... 165/42 |
| 5,836,380 A | * | 11/1998 | Takesita et al. ............ 165/42 X |
| 5,878,806 A | * | 3/1999 | Denk et al. .................... 165/42 |
| 6,036,594 A | | 3/2000 | Kwon et al. ................. 454/156 |
| 6,048,263 A | | 4/2000 | Uchida et al. .............. 454/121 |
| 6,113,483 A | | 9/2000 | Schambre et al. .......... 454/121 |
| 6,186,885 B1 | | 2/2001 | Ahn et al. .................. 454/121 |

* cited by examiner

*Primary Examiner*—L V Ciric
(74) *Attorney, Agent, or Firm*—Brinks Hofer Gilson & Lione (57) ABSTRACT

An automotive HVAC unit includes a housing defining a first outlet adapted to connect to HVAC ductwork to provide conditioned air to a first temperature zone, a second outlet adapted to connect to HVAC ductwork to provide conditioned air to a second temperature zone, a third outlet adapted to connect to HVAC ductwork to provide conditioned air to a third temperature zone, and a fourth rear outlet adapted to connect to HVAC ductwork to provide conditioned air to a fourth temperature zone within the vehicle. The HVAC unit further includes an evaporator adapted to cool air passing therethrough, a heater core adapted to heat air passing therethrough, a blower adapted to force air through the evaporator and the heater core, and a modular insert mounted within the housing and being adapted to control the flow of conditioned air to the first, second, third and fourth outlets.

17 Claims, 6 Drawing Sheets

HVAC SYSTEM WITH MODULAR INSERTS

TECHNICAL FIELD

The present invention generally relates to a modular HVAC insert that allows a vehicle to have multiple different temperature zones.

BACKGROUND

Many automotive vehicles today allow the passengers to control the temperature within different regions of the interior independently. However, equipping a vehicle with independently controllable temperature zones typically involves installing a unique HVAC system for that vehicle along with the related ducts for the appropriate number of temperature zones, which increases the complexity and cost. Therefore, there is a need in the industry for a modular HVAC insert which can be easily modified to provide multiple independent temperature zone control to the passengers within the vehicle.

BRIEF DESCRIPTION OF THE DRAWINGS

FIG. 3b is a top view of the modular inset shown in FIG. 3a;

DETAILED DESCRIPTION OF THE PREFERRED EMBODIMENTS

The following description of the preferred embodiments of the invention is not intended to limit the scope of the invention to this preferred embodiments, but rather to enable any person skilled in the art to make and use the invention.

Figure 1:
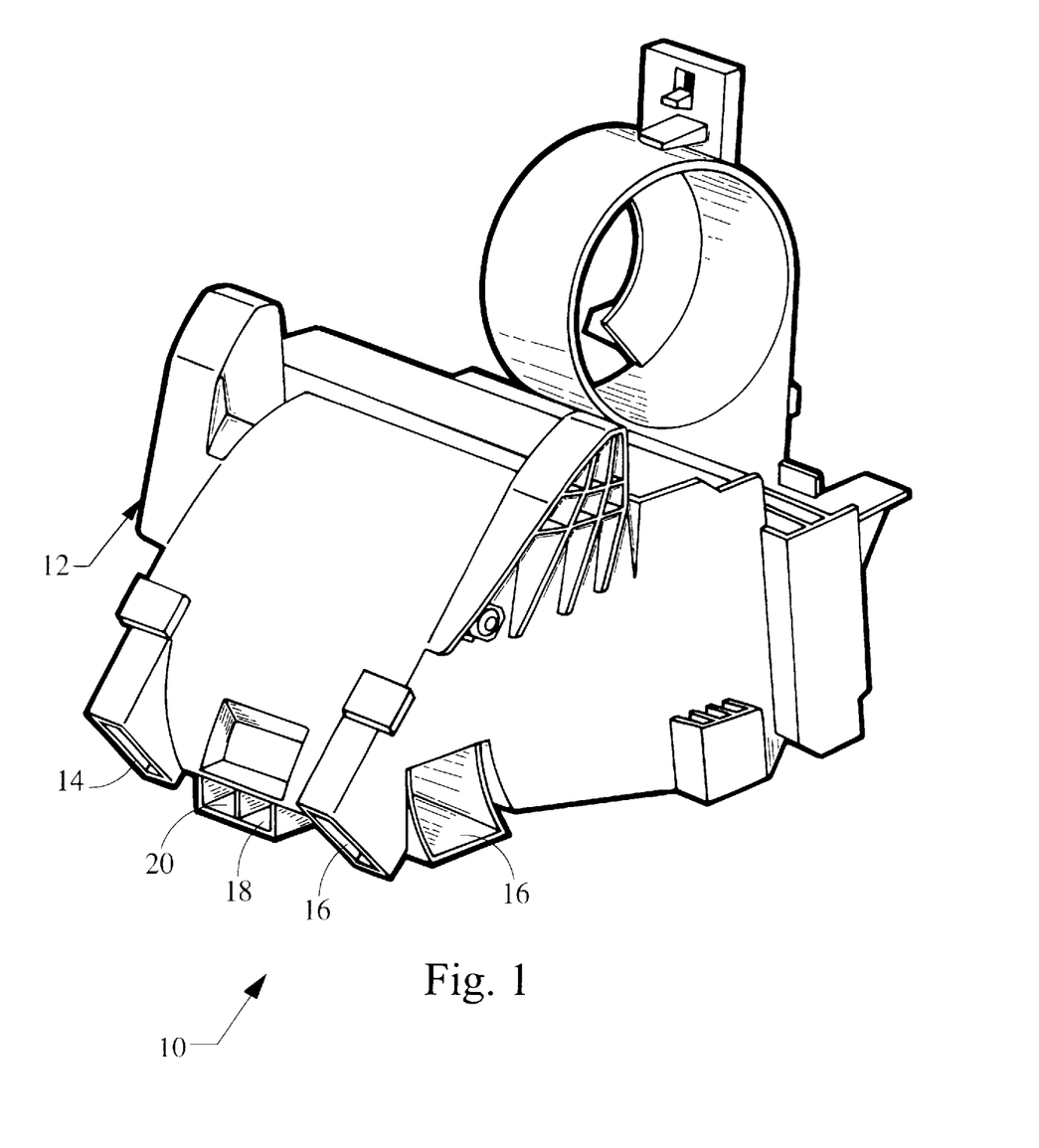
FIG. 1 is a perspective view of an HVAC unit of the present invention.

Referring to FIG. 1, an automotive HVAC unit is shown generally at 10. The HVAC unit includes a housing 12 that defines a first outlet 14 adapted to connect to HVAC ductwork to provide conditioned air to a first temperature zone, a second outlet 16 adapted to connect to HVAC ductwork to provide conditioned air to a second temperature zone, a third outlet 18 adapted to connect to HVAC ductwork to provide conditioned air to a third temperature zone, and a fourth outlet 20 adapted to connect to HVAC ductwork to provide conditioned air to a fourth temperature zone within the vehicle.

Preferably, the first outlet 14 is a left floor outlet and the first temperature zone comprises the driver's sitting area, or the front left side of the passenger compartment. Correspondingly, the second outlet 16 is preferably a right floor outlet and the second temperature zone comprises the front passenger's sitting area, or the front right side of the passenger compartment; the third outlet 18 is preferably a right rear outlet and the third temperature zone comprises the right side of the rear seating area; and the fourth outlet 20 is preferably a left rear outlet and the fourth temperature zone comprises the left side of the rear seating area.

Figure 2:
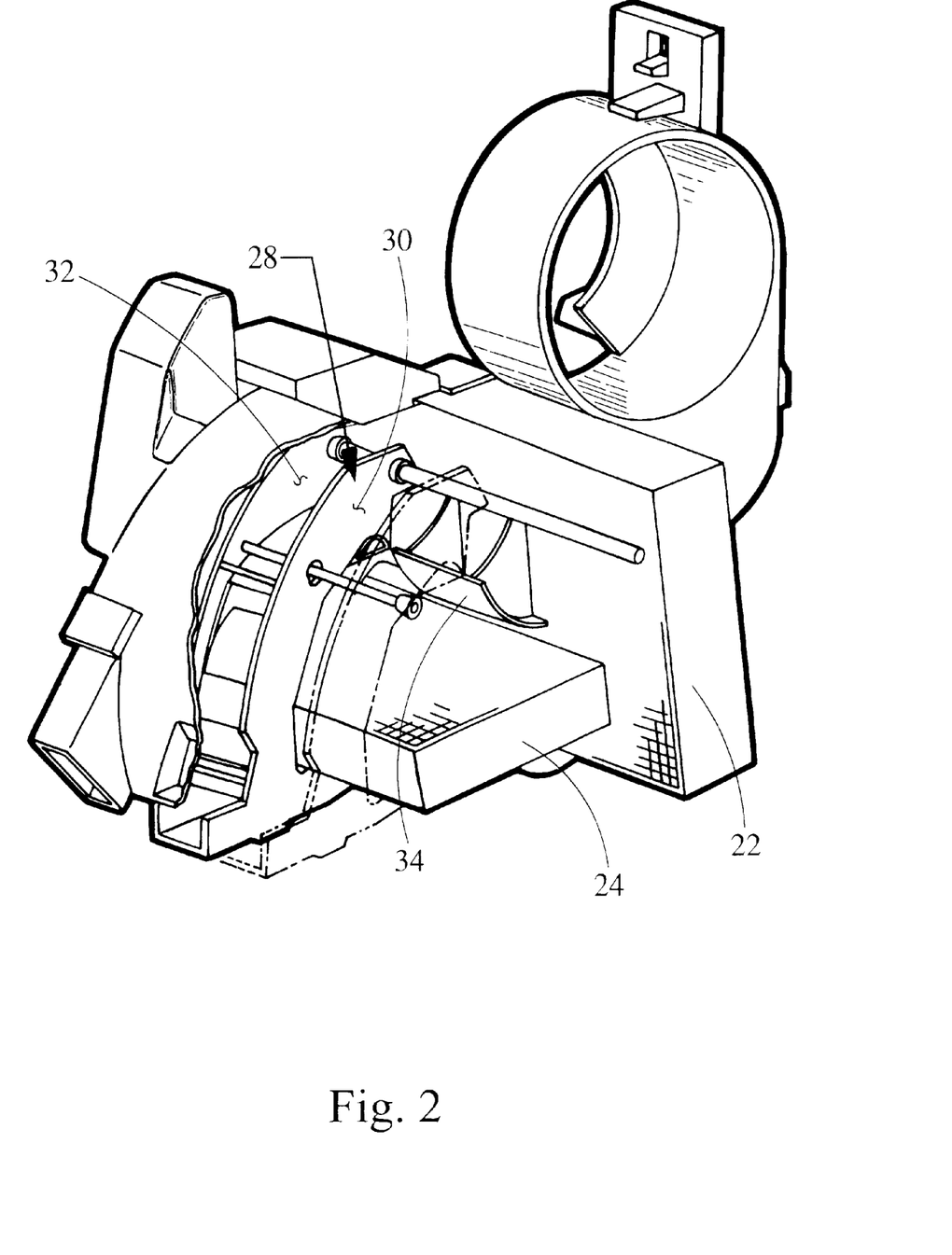
FIG. 2 is a perspective view similar to FIG. 1 wherein a portion of a housing of the unit is cut away.
Figure 3A:
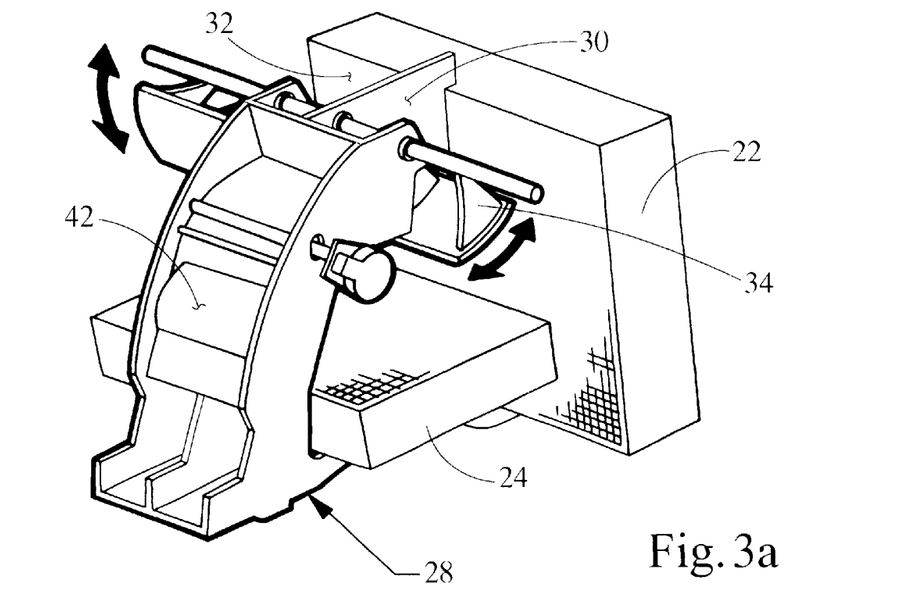
FIG. 3a is a perspective view of a first preferred embodiment of a modular insert for the HVAC unit.
Figure 3B:
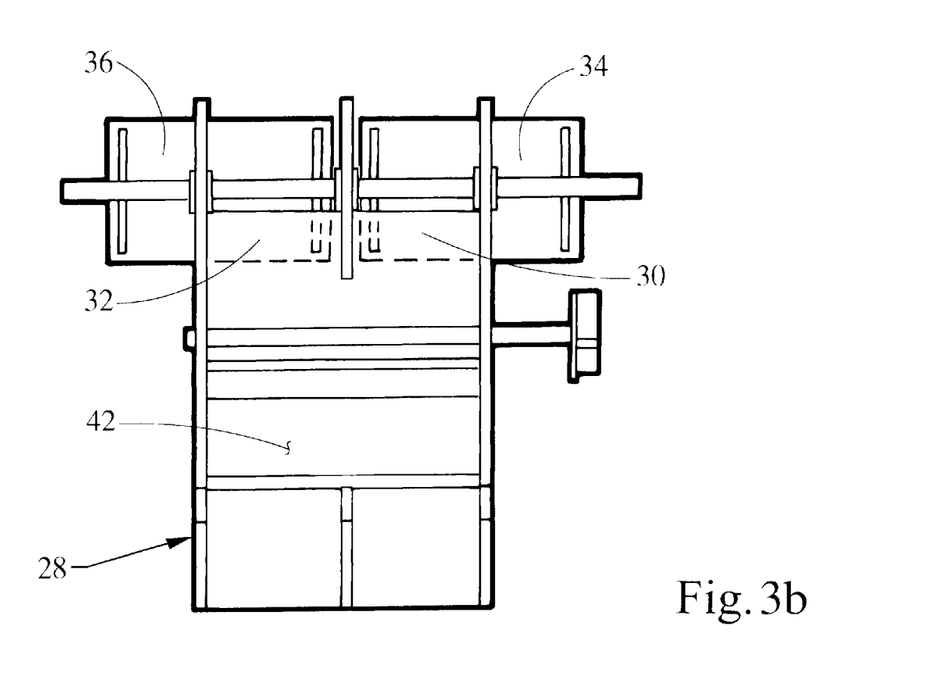

Referring to FIGS. 2, 3a and 3b, the HVAC system further includes an evaporator 22 that cools the air which flows through the evaporator 22 and a heater core 24 that heats the air which flows through the heater core 24. A blower (not shown) is mounted upstream of the evaporator 22 and the heater core 24 and forces external air into the HVAC unit and through the evaporator 22 and heater core 24. The evaporator and heater core are preferably conventional devices of the type commonly used in automotive HVAC systems, however the evaporator and heater core could be any suitably heating and cooling devices without departing from the scope of the present invention.

A modular insert 28 is removably mounted within the housing 12 and is adapted to control the flow of conditioned air to the right and left floor outlets 14, 16 and the right and left rear outlets 18, 20. By selecting an appropriate modular insert 28, flow of air from the evaporator 22 and heater core 24 can be directed to, or restricted from the outlets, thereby allowing the system to have one, two, three or four discreet temperature zones. The modular insert 28 includes an first blending chamber 30 and a second blending chamber 32. Preferably, the first blending chamber 30 is an upper right blending chamber which receives air from the heater core 24 and the evaporator 22 and allows the air from the heater core 24 and the evaporator 22 to mix. After the air mixes within the upper right blending chamber 30, the air is directed to the right floor outlet 14. Further, preferably, the second blending chamber 32 is an upper left blending chamber which receives air from the heater core 24 and the evaporator 22 and allows the air from the heater core 24 and the evaporator 22 to mix. After the air mixes within the upper left blending chamber 32, the air is directed to the left floor outlet 16.

Figure 4:
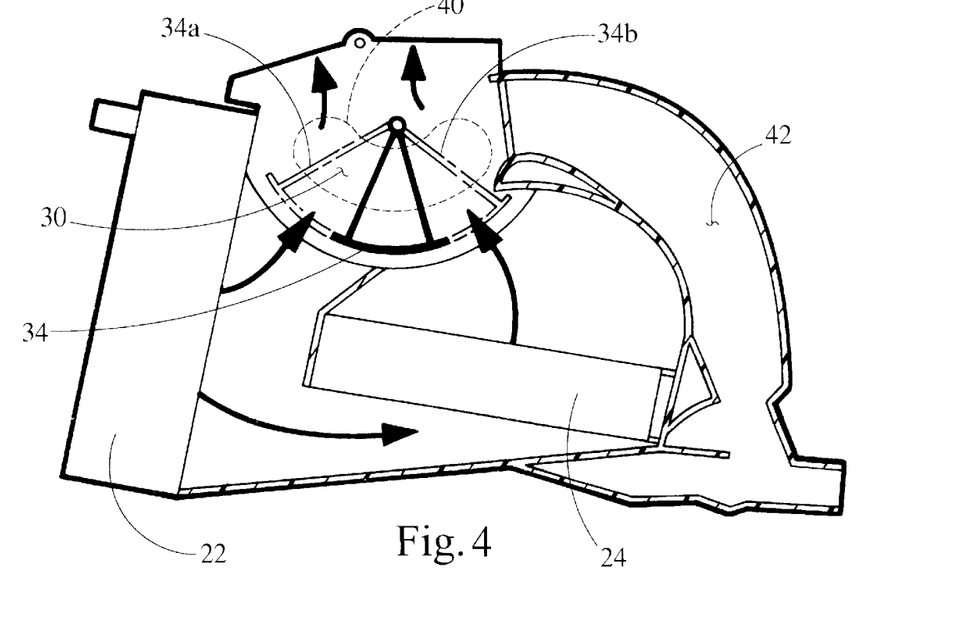
FIG. 4 is sectional view of the HVAC unit of the first preferred embodiment.

Referring to FIG. 4, a first blend door 34 is pivotally mounted within the modular insert 28 to selectively control the proportions of air from the heater core 24 and air from the evaporator 22 flowing into the upper right blending chamber 30. Preferably, the first blend door 34 pivots between a first position, as indicated at 34a, where the air flow from the evaporator 22 is completely blocked and the air flow from the heater core 24 is unrestricted, and a second position, as indicated by 34b, where the air flow from the heater core 24 is completely blocked and the air flow from the evaporator 22 is unrestricted. Similarly, a second blend door 36, shown in FIGS. 3a and 3b, is pivotally mounted within the modular insert 28 to selectively control the proportions of air from the heater core 24 and air from the evaporator 22 flowing into the upper left blending chamber 32. Depending upon the desired conditions, the driver of the vehicle can adjust the position of the first and second blending doors 34, 36 to gauge the mixture of heated air from the heater core 24 and cool air from the evaporator 22 to achieve the desired temperature within the vehicle.

In a first preferred embodiment, the modular insert 28 includes a link 38 which connects the first blend door 34 and the second blend door 36 to one another such that the proportions of air from the heater core 24 and air from the evaporator 22 flowing into the upper right blending chamber 30 and the upper left blending chamber 32 are substantially equal. By controlling the movement of the first and second blend doors 34, 36 in conjunction, the temperature within the first and second temperature zones is kept substantially the same, effectively combining the first and second zones into a single temperature zone, and thereby providing single-zone temperature control within the vehicle.

In a variation of the first preferred embodiment, as shown in FIG. 4, a first blending orifice 40 interconnects the upper right blending chamber 30 and the upper left blending chamber 32 to allow fluid communication therebetween. This provides a single blending chamber which will supply conditioned air to each of the first and second temperature zones within the vehicle to maintain more consistent single-zone temperature control within the first and second temperature zones.

Figure 5:
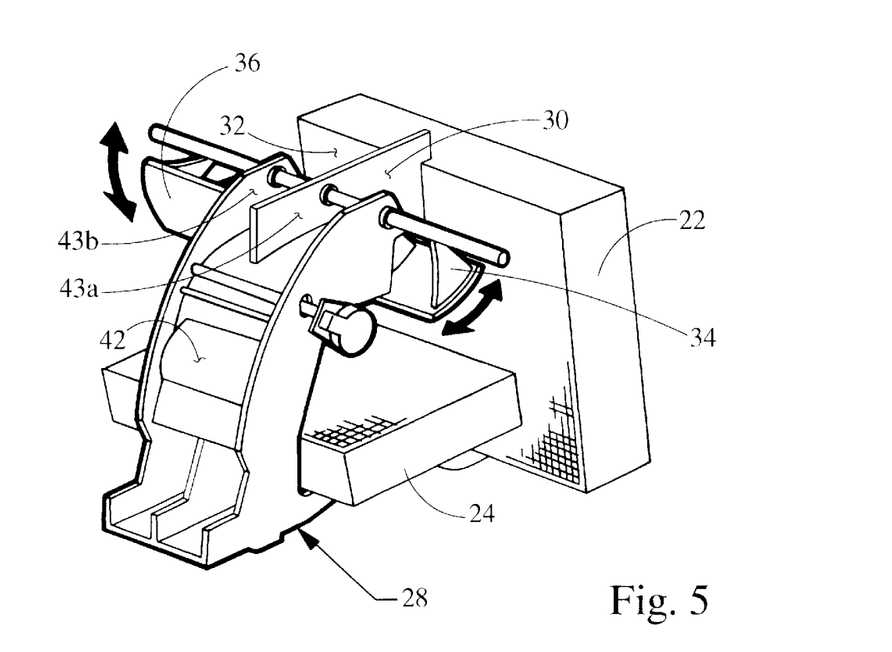
FIG. 5 is a perspective view of a variation of the first preferred embodiment.
Figure 6:
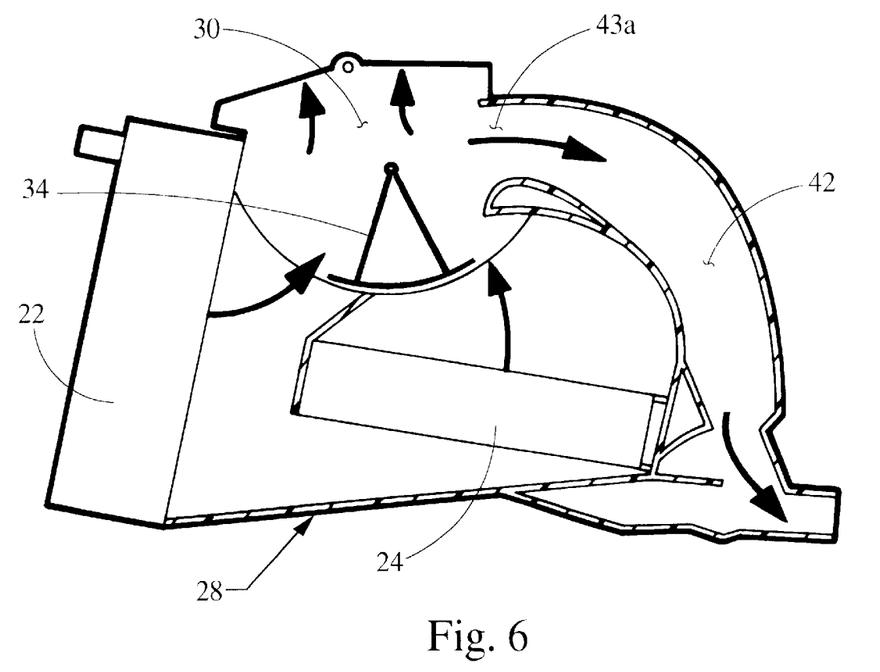
FIG. 6 is a sectional view of the HVAC unit shown in FIG. 5.

As shown in FIGS. 2, 3 and 4, the HVAC unit of the first preferred embodiment does not provide any air flow to the third and fourth temperature zones. The modular insert 28 includes a duct 42 which is adapted to allow air from the upper right and upper left blending chambers 30, 32 to the third and fourth outlets 18, 20. Referring to FIGS. 5 and 6, in a second variation of the first preferred embodiment, the modular insert 28 includes a first passages 43a, 43b that interconnect the upper right and upper left blending chambers 30, 32 to the duct 42. Therefore, air is directed from the upper right and upper left blending chambers 30, 32 to all of the outlets 14, 16, 18, 20, and thereby, to all of the temperature zones. However, because air flow to each temperature zone originates from the upper right and upper left blending chambers 30, 32, the temperature of the air being delivered to each of the temperature zones is substantially the same, such that the temperature zones are effectively combined into a single temperature zone, thereby providing single-zone temperature control within the vehicle.

In a second preferred embodiment, the modular insert 28 is substantially the same as the first preferred embodiment shown in FIGS. 2, 3 and 4, however, the blend doors 34, 36 of the second preferred embodiment are not linked. Therefore, the first blend door 34 operates independently of the second blend door 36 such that the proportions of air from the heater core 24 and air from the evaporator 22 flowing into the upper right and upper left blend chambers 30, 32 are separately controllable. This allows the passengers within the vehicle to selectively position the first and second blend doors 34, 36 such that air being supplied to the first temperature zone is at a different temperature than the air being supplied to the second temperature zone, and providing dual-zone temperature control within the vehicle.

Figure 7:
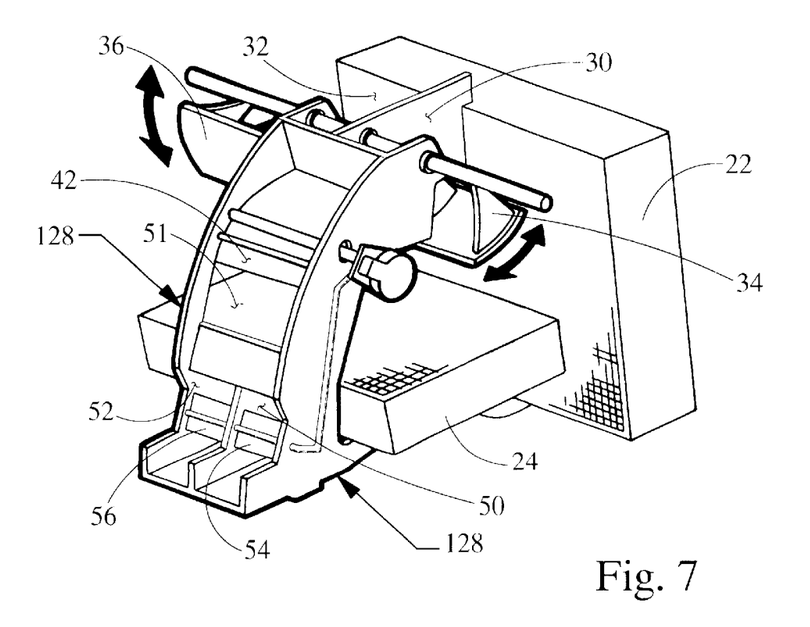
FIG. 7 is a perspective view of a modular insert for a third preferred embodiment.
Figure 8:
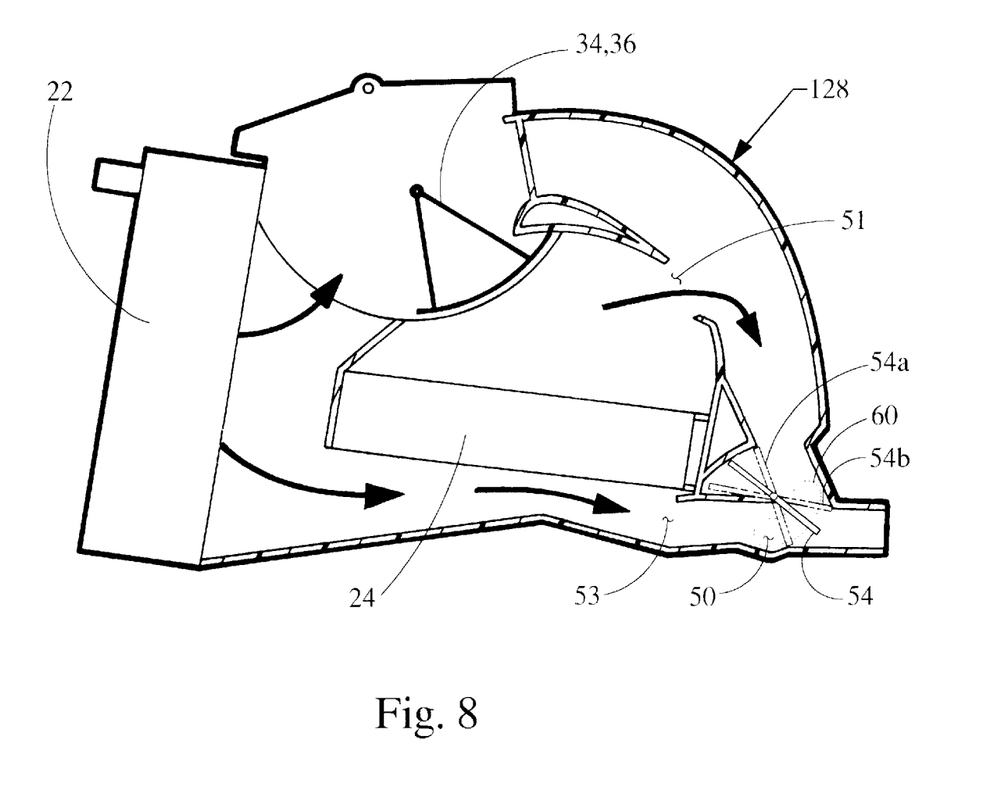
FIG. 8 is a sectional view of the third preferred embodiment.

Referring to FIGS. 7 and 8, in a third preferred embodiment, wherein similar components are numbered the same, a modular insert 128 includes first and second blend doors 34, 36 that are linked to one another such that the proportions of air from the heater core 24 and air from the evaporator 22 flowing into the upper right and left blending chambers 30, 32 are substantially equal. By controlling the upper right and upper left blend doors 34, 36 in conjunction, the temperature within the first and second temperature zones is kept substantially the same.

Additionally, the modular insert 128 of the third preferred embodiment includes a third blending chamber 50 and a fourth blending chamber 52. Preferably, the third blending chamber 50 is a lower right blending chamber that is adapted to receive air from the heater core 24 and the evaporator 22 and to deliver blended air to the right rear outlet 18, and the fourth blending chamber 52 is a lower left blending chamber that is adapted to receive air from the heater core 24 and the evaporator 22 and to deliver the blended air to the left rear outlet 20. A second passage 51 within the modular insert 128 allows air to flow from the heater core 24 into the duct 42 and into the third and fourth blending chambers 50, 52 and a third passage 53 within the modular insert 128 allows air to flow from the evaporator 22 into the third and fourth blending chambers 50, 52.

The modular insert 128 further includes a third blend door 54 that is pivotally mounted within the modular insert 128 to selectively control the proportions of air from the heater core 24 and air from the evaporator 22 flowing into the lower right blending chamber 50. Preferably, the door pivots between a first position, as indicated by 54a, where the air flow through the third passage 53 from the evaporator 22 is completely blocked and the air flow through the second passage 51 from the heater core 24 is unrestricted, and a second position, as indicated by 54b, where the air flow through the second passage 51 from the heater core 24 is completely blocked and the air flow through the third passage 53 from the evaporator 22 is unrestricted. Similarly, a fourth blend door 56 is pivotally mounted within the modular insert 128 to selectively control the proportions of air from the heater core and air from the evaporator flowing into the lower left blending chamber 52. Depending upon the desired conditions, the driver of the vehicle can adjust the position of the blending doors 34, 36, 54, 56 to gage the mixture of heated air from the heater core 24 and cool air from the evaporator 22 to achieve the desired temperature within the vehicle.

The lower right and lower left blend doors 54, 56 are linked to one another such that the proportions of air from the heater core 24 and air from the evaporator 22 flowing into the lower right blending chamber 50 and the lower left blending chamber 52 are substantially equal. By controlling the third and fourth blend doors 54, 56 in conjunction, the temperature within the third and fourth temperature zones is kept substantially the same. Therefore, the modular insert 128 of the third preferred embodiment delivers air to the first and second temperature zones at substantially the same temperature, effectively combining the first and second temperature zones into a single zone, and delivers air to the third and fourth temperature zones at substantially the same temperature, effectively combining the third and fourth temperature zones into a single zone, thereby providing dual-zone temperature control within the vehicle.

In a variation of the third preferred embodiment the modular insert 128 includes a second blending orifice 60 which interconnects the lower right blending chamber 50 and the lower left blending chamber 52 to allow fluid communication therebetween. This provides a single blending chamber which will supply conditioned air to each of the third and fourth temperature zones within the vehicle to maintain more consistent temperature within the third and fourth temperature zones.

In a fourth preferred embodiment the modular insert 128 includes first and second blend doors 34, 36 are not linked and operate independently of one another such that the proportions of air from the heater core 24 and air from the evaporator 22 flowing into the upper right and upper left blend chambers 30, 32 are separately controllable. This allows the passengers within the vehicle to selectively position the upper left and upper right blend doors 30, 32 such that air being supplied to the first temperature zone is at a different temperature than the air being supplied to the second temperature zone.

Further, third and fourth blend doors 54, 56 of the fourth preferred embodiment are linked to one another such that the proportions of air from the heater core 24 and air from the evaporator 22 flowing into the lower right and lower left blending chambers 50, 52 are substantially equal. By controlling the third and fourth blend doors 54, 56 in conjunction, the temperature within the third and fourth temperature zones is kept substantially the same. Therefore, the modular insert 128 of the fourth preferred embodiment delivers air to the first and second temperature zones independently, and delivers air to the third and fourth temperature zones and substantially the same temperature, effectively combining the third and fourth temperature zones into a single zone, thereby providing three-zone temperature control within the vehicle.

In a variation of the fourth preferred embodiment, a second blending orifice 60 interconnects the lower right blending chamber 50 and the lower left blending chamber 52 to allow fluid communication therebetween. This provides a single blending chamber which will supply conditioned air to each of the third and fourth temperature zones within the vehicle to maintain more consistent temperature within the third and fourth temperature zones.

In a fifth preferred embodiment, the modular insert 128 includes first and second blend doors 34, 36 that are not linked and operate independently of one another such that the proportions of air from the heater core 24 and air from the evaporator 22 flowing into the upper right and upper left blend chambers 30, 32 are separately controllable. This allows the passengers within the vehicle to selectively position the upper left and upper right blend doors 30, 32 such that air being supplied to the first temperature zone is at a different temperature than the air being supplied to the second temperature zone.

Further, the modular insert 128 of the fifth preferred embodiment includes a lower right blend door 54 that operates independently of the lower left blend door 56 such that the proportions of air from the heater core 24 and air from the evaporator 22 flowing into the lower right blending chamber 50 and the lower left blending chamber 52 are separately controllable. This allows the passengers within the vehicle to selectively position the third and fourth blend doors 54, 56 such that air being supplied to the third temperature zone is at a different temperature than the air being supplied to the fourth temperature zone. The HVAC unit 10 of the fifth preferred embodiment allows the passengers within the vehicle to control the temperature of all four temperature zones independently of one another, thereby providing four-zone temperature control within the vehicle.

The foregoing discussion discloses and describes five preferred embodiments and variation thereof. One skilled in the art will readily recognize from such discussion, and from the accompanying drawings and claims, that changes and modifications can be made to the preferred embodiments without departing from the scope of the inventive concepts as defined in the following claims. The preferred embodiments have been described in an illustrative manner, and it is to be understood that the terminology which has been used is intended to be in the nature of words of description rather than of limitation.

What is claimed is:

1. An automotive HVAC unit comprising:
    a housing defining a first outlet adapted to connect to HVAC ductwork to provide conditioned air to a first temperature zone, a second outlet adapted to connect to HVAC ductwork to provide conditioned air to a second temperature zone, a third outlet adapted to connect to HVAC ductwork to provide conditioned air to a third temperature zone, and a fourth rear outlet adapted to connect to HVAC ductwork to provide conditioned air to a fourth temperature zone within the vehicle;
    an evaporator adapted to cool air passing therethrough;
    a heater core adapted to heat air passing therethrough;
    a blower adapted to force air through said evaporator and said heater core;
    a modular insert mounted within said housing and being adapted to control the flow of conditioned air to said first, second, third and fourth outlets, said modular insert including a first blending chamber adapted to receive air from said heater core and said evaporator and to deliver blended air to said first outlet and a second blending chamber adapted to receive air from said heater core and said evaporator and to deliver blended air to said second outlet, and a first blend door for selectively controlling the proportions of air from the heater core and air from the evaporator flowing into said first blending chamber, and a second blend door for selectively controlling the proportion of air from the heater core to air from the evaporator that enters said second blending chamber.

2. The HVAC unit of claim 1 wherein said first blend door and said second blend door are linked to one another such that the proportions of air from the heater core and air from the evaporator flowing into said first and second blend chamber are substantially equal, thereby keeping the conditions within the first and second temperature zones within the vehicle substantially the same.

3. The HVAC unit of claim 2 wherein said first blending chamber and said second blending chamber are interconnected to allow fluid communication therebetween.

4. The HVAC unit of claim 2 wherein said modular insert further includes:
    a third blending chamber adapted to receive air from said heater core and said evaporator and to deliver blended air to said third outlet and a fourth blending chamber adapted to receive air from said heater core and said evaporator and to deliver blended air to said fourth outlet; and
    a third blend door for selectively controlling the proportions of air from the heater core and air from the evaporator flowing into said third blending chamber, and a fourth blend door for selectively controlling the proportions of air from the heater core and air from the evaporator flowing into said fourth blending chamber.

5. The HVAC unit of claim 4 wherein said third and fourth blend doors are linked to one another such that the proportions of air from the heater core and air from the evaporator are substantially equal in said third and fourth blending chambers, thereby keeping the conditions within the third and fourth temperature zones within the vehicle substantially the same.

6. The HVAC unit of claim 5 wherein said third blending chamber and said fourth blending chamber are interconnected to allow fluid communication therebetween.

7. The HVAC unit of claim 4 wherein said third blend door operates independently of said fourth blend door such that the proportions of air from the heater core and air from the evaporator within said third and fourth blending chambers are separately controllable, thereby allowing the conditions within the third and fourth temperature zones within the vehicle to be different.

8. The HVAC unit of claim 1 wherein said first blend door operates independently of said second blend door such that the proportions of air from the heater core and air from the evaporator flowing into said first and second blend chambers are separately controllable, thereby allowing the conditions within the first and second temperature zones within the vehicle to be different.

9. The HVAC unit of claim 8 wherein said modular insert further includes:
   a third blending chamber adapted to receive air from said heater core and said evaporator and to deliver blended air to said third outlet and a fourth blending chamber adapted to receive air from said heater core and said evaporator and to deliver blended air to said fourth outlet; and
   a third blend door for selectively controlling the proportions of air from the heater core and air from the evaporator flowing into said third blending chamber, and a fourth blend door for selectively controlling the proportions of air from the heater core and air from the evaporator flowing into said fourth blending chamber.

10. The HVAC unit of claim 9 wherein said third and fourth blend doors are linked to one another such that the proportions of air from the heater core and air from the evaporator are substantially equal in said third and fourth blending chambers, thereby keeping the conditions within the third and fourth temperature zones within the vehicle substantially the same.

11. The HVAC unit of claim 10 wherein said third blending chamber and said fourth blending chamber are interconnected to allow fluid communication therebetween.

12. The HVAC unit of claim 9 wherein said third blend door operates independently of said fourth blend door such that the proportions of air from the heater core and air from the evaporator within said third and fourth blending chambers are separately controllable, thereby allowing the conditions within the third and fourth temperature zones within the vehicle to be different.

13. The HVAC unit of claim 1 wherein a duct interconnects said first and second blending chambers to said third and fourth outlets.

14. A An automotive HVAC unit comprising:
   a housing defining a first outlet adapted to connect to HVAC ductwork to provide conditioned air to a first temperature zone, a second outlet adapted to connect to HVAC ductwork to provide conditioned air to a second temperature zone, a third outlet adapted to connect to HVAC ductwork to provide conditioned air to a third temperature zone, and a fourth rear outlet adapted to connect to HVAC ductwork to provide conditioned air to a fourth temperature zone within the vehicle;
   an evaporator adapted to cool air passing therethrough;
   a heater core adapted to heat air passing therethrough;
   a blower adapted to force air through said evaporator and said heater core; and
   a modular insert mounted within said housing and being adapted to control the flow of conditioned air to said first, second, third and fourth outlets;
   said modular insert including a first blending chamber adapted to receive air from said heater core and said evaporator and to deliver blended air to said first outlet, a second blending chamber interconnected to and in fluid communication with said first blending chamber and adapted to receive air from said heater core and said evaporator and to deliver blended air to said second outlet, a first blend door for selectively controlling the proportions of air from the heater core and air from the evaporator flowing into said first blending chamber, and a second blend door for selectively controlling the proportion of air from the heater core to air from the evaporator that enters said second blending chamber;
   said first blend door and said second blend door being linked to one another such that the proportions of air from the heater core and air from the evaporator flowing into said first and second blend chamber are substantially equal, thereby keeping the conditions within the first and second temperature zones within the vehicle substantially the same.

15. An automotive HVAC unit comprising:
   a housing defining a first outlet adapted to connect to HVAC ductwork to provide conditioned air to a first temperature zone, a second outlet adapted to connect to HVAC ductwork to provide conditioned am to a second temperature zone, a third outlet adapted to connect to HVAC ductwork to provide conditioned air to a third temperature zone, and a fourth rear outlet adapted to connect to HVAC ductwork to provide conditioned air to a fourth temperature zone within the vehicle;
   an evaporator adapted to cool air passing therethrough;
   a heater core adapted to heat air passing therethrough;
   a blower adapted to force air through said evaporator and said heater core; and
   a modular insert mounted within said housing and being adapted to control the flow of conditioned air to said first, second, third and fourth outlets;
   said modular insert including a first blending chamber adapted to receive air from said heater core and said evaporator and to deliver blended air to said first outlet, a second blending chamber interconnected to and in fluid communication with said first blending chamber and adapted to receive air from said heater core and said evaporator and to deliver blended air to said second outlet, a third blending chamber adapted to receive air from said heater core and said evaporator and to deliver blended air to said third outlet, a fourth blending chamber interconnected to and in fluid communication with said third blending chamber and adapted to receive air from said heater core and said evaporator and to deliver blended air to said fourth outlet, a first blend door for selectively controlling the proportions of air from the heater core and air from the evaporator flowing into said first blending chamber, a second blend door for selectively controlling the proportion of air from the heater core to air from the evaporator that enters said second blending chamber, a third blend door for selectively controlling the proportions of air from the heater corn and air from the evaporator flowing into said third blending chamber, and a fourth blend door for selectively controlling the proportions of air from the heater core and air from the evaporator flowing into said fourth blending chamber;
   said first blend door and said second blend door being linked to one another such that the proportions of air from the heater core and air from the evaporator flowing into said first and second blend chamber are substantially equal, thereby keeping the conditions within the first and second temperature zones within the vehicle substantially the same, and said third and fourth blend doors being linked to one another such that the proportions of air from the heater core and air from the evaporator are substantially equal in said third and fourth blending chambers, thereby keeping the conditions within the third and fourth temperature zones within the vehicle substantially the same.

16. An automotive HVAC unit comprising:
   a housing defining a first outlet adapted to connect to HVAC ductwork to provide conditioned sir to a first temperature zone, a second outlet adapted to connect to HVAC ductwork to provide conditioned air to a second temperature zone, a third outlet adapted to connect to HVAC ductwork to provide conditioned air to a third temperature zone, and a fourth rear outlet adapted to connect to HVAC ductwork to provide conditioned air to a fourth temperature zone within the vehicle;

an evaporator adapted to cool air passing therethrough;

a heater core adapted to heat air passing therethrough;

a blower adapted to force air through said evaporator and said heater core; and a modular insert mounted within said housing and being adapted to control the flow of conditioned air to said first, second, third and fourth outlets;

said modular insert including a first blending chamber adapted to receive air from said heater core and said evaporator and to deliver blended air to said first outlet, a second blending chamber interconnected to and in fluid communication with said first blending chamber and adapted to receive air from said heater core and said evaporator and to deliver blended air to said second outlet, a third blending chamber adapted to receive air from said heater core and said evaporator and to deliver blended air to said third outlet, a fourth blending chamber interconnected to and in fluid communication with said third blending chamber and adapted to receive air from said heater core and said evaporator and to deliver blended air to said fourth outlet, a first blend door for selectively controlling the proportions of air from the heater core and air from the evaporator flowing into said first blending chamber, a second blend door for selectively controlling the proportion of air from the heater core to air from the evaporator that enters said second blending chamber, a third blend door for selectively controlling the proportions of air from the heater core and air from the evaporator flowing into said third blending chamber, and a fourth blend door for selectively controlling the proportions of air from the heater core and air from the evaporator flowing into said fourth blending chamber;

said first blend door and said second blend door being operable indepedantly of one another such that the proportions of air from the heater core and air from the evaporator flowing into said first and second blend chambers are separately controllable, thereby allowing the conditions within the first and second temperature zones within the vehicle to be different, and said third and fourth blend doors being linked to one another such that the proportions of air from the heater core and air from the evaporator are substantially equal in said third and fourth blending chambers, thereby keeping the conditions within the third and fourth temperature zones within the vehicle substantially the same.

17. An automotive HVAC unit comprising:

a housing defining a first outlet adapted to connect to HVAC ductwork to provide conditioned air to a first temperature zone, a second outlet adapted to connect to HVAC ductwork to provide conditioned air to a second temperature zone, a third outlet adapted to connect to HVAC ductwork to provide conditioned air to a third temperature zone, and a fourth rear outlet adapted to connect to HVAC ductwork to provide conditioned air to a fourth temperature zone within the vehicle;

an evaporator adapted to cool air passing therethrough;

a heater core adapted to heat air passing therethrough;

a blower adapted to force air through said evaporator and said heater core; and a modular insert mounted within said housing and being adapted to control the flow of conditioned air to said first, second, third and fourth outlets;

said modular insert including a first blending chamber adapted to receive air from said heater core and said evaporator and to deliver blended air to said first outlet, a second blending chamber interconnected to and in fluid communication with said first blending chamber and adapted to receive air from said heater core and said evaporator and to deliver blended air to said second outlet, a third blending chamber adapted to receive air from said heater core and said evaporator and to deliver blended air to said third outlet, a fourth blending chamber interconnected to and in fluid communication with said third blending chamber and adapted to receive air from said heater core and said evaporator and to deliver blended air to said fourth outlet, a first blend door for selectively controlling the proportions of air from the heater core and air from the evaporator flowing into said first blending chamber, a second blend door for selectively controlling the proportion of air from the heater core to air from the evaporator that enters said second blending chamber, a third blend door for selectively controlling the proportions of air from the heater core and air from the evaporator flowing into said third blending chamber, and a fourth blend door for selectively controlling the proportions of air from the heater core and air from the evaporator flowing into said fourth blending chamber;

said first blend door and said second blend door being operable indepedantly of one another such that the proportions of air from the heater core and air from the evaporator flowing into said first and second blend chambers are separately controllable, thereby allowing the conditions within the first and second temperature zones within the vehicle to be different, and said third and fourth blend doors being operable independently of one another such that the proportions of air from the heater core and air from the evaporator within said third and fourth blending chambers are separately controllable, thereby allowing the conditions within the third and fourth temperature zones within the vehicle to be different.

* * * * *

UNITED STATES PATENT AND TRADEMARK OFFICE
CERTIFICATE OF CORRECTION

PATENT NO. : 6,772,833 B2
DATED : August 10, 2004
INVENTOR(S) : Soenke Auer et al.

It is certified that error appears in the above-identified patent and that said Letters Patent is hereby corrected as shown below:

<u>Column 8,</u>
Line 5, after "conditioned" delete "am" and substitute -- air -- in its place.
Line 47, after "the heater" delete "corn" and substitute -- core -- in its place.
Line 67, after "conditioned" delete "sir" and substitute -- air -- in its place.

<u>Column 9,</u>
Line 43, delete "independantly" and substitute -- independently -- in its place.

<u>Column 10,</u>
Line 43, delete "independantly" and substitute -- independently -- in its place.

Signed and Sealed this

Ninth Day of November, 2004

JON W. DUDAS
*Director of the United States Patent and Trademark Office*